US011032399B2

(12) United States Patent
Todd et al.

(10) Patent No.: US 11,032,399 B2
(45) Date of Patent: Jun. 8, 2021

(54) DYNAMIC CERTIFICATION FOR CONFIGURATION CHANGES TO SOFTWARE DEFINED RADIO IMPLEMENTED DEVICES

(71) Applicant: EMC IP Holding Company LLC, Hopkinton, MA (US)

(72) Inventors: Stephen J. Todd, Center Conway, NH (US); Jason A. Shepherd, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 348 days.

(21) Appl. No.: 16/220,776

(22) Filed: Dec. 14, 2018

(65) Prior Publication Data

US 2020/0195758 A1 Jun. 18, 2020

(51) Int. Cl.
| | |
|---|---|
| H04L 29/06 | (2006.01) |
| G06F 16/182 | (2019.01) |
| G06Q 20/38 | (2012.01) |
| H04L 1/00 | (2006.01) |
| H04W 24/10 | (2009.01) |
| H04L 9/32 | (2006.01) |

(52) U.S. Cl.
CPC .......... *H04L 69/18* (2013.01); *G06F 16/1824* (2019.01); *G06F 16/1834* (2019.01); *G06Q 20/38215* (2013.01); *H04L 1/0001* (2013.01); *H04L 9/3213* (2013.01); *H04L 9/3247* (2013.01); *H04W 24/10* (2013.01)

(58) Field of Classification Search
CPC ..... H04L 69/18; H04L 1/0001; H04L 9/3213; H04L 9/3247; G06F 16/1824; G06F 16/1834; G06Q 20/38215; H04W 24/10

USPC .................................................... 455/552.1
See application file for complete search history.

(56) References Cited

U.S. PATENT DOCUMENTS

| 6,611,506 B1* | 8/2003 | Huang ................. H04W 28/08 370/329 |
|---|---|---|
| 10,624,008 B2* | 4/2020 | Takeuchi ................. H04W 8/24 |
| 2008/0080549 A1* | 4/2008 | Rofougaran .......... H03F 1/0222 370/458 |

(Continued)

FOREIGN PATENT DOCUMENTS

WO    WO-2016114688 A1 *  7/2016    ............. H04L 69/24

OTHER PUBLICATIONS

Satoshi Nakamoto, "Bitcoin: A Peer-to-Peer Electronic Cash System," http://bitcoin.org/bitcoin.pdf, 2008, 9 pages.

(Continued)

*Primary Examiner* — James D Nigh
(74) *Attorney, Agent, or Firm* — Ryan, Mason & Lewis, LLP

(57) ABSTRACT

A compute node currently operating within a given computing environment and currently enabled to support at least a first communication protocol obtains one or more instructions for enabling the compute node to support a second communication protocol. In response to the one or more instructions, one or more configuration parameters associated with the compute node are automatically reconfigured to support the second communication protocol. An automatic determination is made, in the given computing environment within which the compute node currently operates, whether or not to certify the compute node for the second communication protocol.

20 Claims, 9 Drawing Sheets

(56) References Cited

U.S. PATENT DOCUMENTS

| | | | | |
|---|---|---|---|---|
| 2008/0279128 | A1* | 11/2008 | Hassan | H04W 8/22 |
| | | | | 370/310 |
| 2011/0121865 | A1* | 5/2011 | Olmos | H03K 19/00384 |
| | | | | 327/77 |
| 2011/0269494 | A1* | 11/2011 | Kobayashi | H04W 36/30 |
| | | | | 455/509 |
| 2016/0050298 | A1* | 2/2016 | Lechowicz | H04L 69/08 |
| | | | | 709/230 |
| 2017/0164417 | A1* | 6/2017 | Kress | H04W 76/14 |
| 2018/0097690 | A1* | 4/2018 | Yocam | H04W 4/70 |
| 2019/0140919 | A1* | 5/2019 | Smith | H04L 41/5019 |
| 2020/0374700 | A1* | 11/2020 | Smith | H04L 9/3247 |

OTHER PUBLICATIONS

Wikimedia Commons, "File: SDR et WF.svg," https://commons.wikimedia.org/w/index.php?curid=8831874, Mar. 9, 2015, 3 pages.

C. Gavrilă et al., "SDR-Based Gateway for IoT and M2M Applications," Baltic URSI Symposium (URSI), May 15-17, 2018, pp. 71-74.

B. Gu et al., "SWICOM: An SDR-Based Wireless Communication Gateway for Vehicles," IEEE Transactions on Vehicular Technology, May 2010, pp. 1593-1605, vol. 59, No. 4.

* cited by examiner

DYNAMIC CERTIFICATION FOR CONFIGURATION CHANGES TO SOFTWARE DEFINED RADIO IMPLEMENTED DEVICES

FIELD

The field relates generally to communication systems and, more particularly, to device management in such communication systems.

BACKGROUND

Many technology-based enterprises have a large information technology (IT) infrastructure comprising a network of computing resources distributed across a geographic environment. These computing resources may be mobile (e.g., in a vehicle or mobile device) and/or remain at a fixed location (e.g., in stationary equipment). In some scenarios, these computing resources are part of an Internet of Things (IoT) network.

For example, a given IoT network may include sensors that monitor one or more conditions in one or more environments in which they reside by collecting data and providing data (either raw collected data and/or data processed by the sensor) to one or more computing nodes, i.e., gateways, associated with the enterprise or other entity. By way of example only, such sensors may be part of smart devices, smart cities, smart grids, connected cars, health monitors, home automation and energy management systems, and/or remote industrial process control systems, just to name a few applications. Furthermore, other devices in the IoT network that are also in communication with a gateway may include devices (e.g., programmable logic controllers) that are actuated or otherwise controlled by an enterprise or other entity through the gateway. Such devices (sensors and/or actuators) may be part of systems referred to as Industrial Control Systems (ICS) or Supervisory Control and Data Acquisition (SCADA) systems. Typically, IoT devices are in communication with a gateway through a wireless communication protocol (e.g., cellular, WiFi, Bluetooth™, LoRaWAN™, etc.).

IoT equipment (including sensors, actuators, and gateways) typically needs to go through a certification process managed by the Federal Communications Commission (FCC). The certification process tests and approves that the electromagnetic interference (EMI) level associated with a given piece of equipment is at or under a safe limit. However, because the certification process is based on the number of wireless communication protocols supported by the IoT equipment, the process can be time-intensive.

SUMMARY

Embodiments of the invention provide techniques for device management in a communication environment.

For example, in one illustrative embodiment, a method comprises the following steps. A compute node currently operating within a given computing environment and currently enabled to support at least a first communication protocol obtains one or more instructions for enabling the compute node to support a second communication protocol. In response to the one or more instructions, one or more configuration parameters associated with the compute node are automatically reconfigured to support the second communication protocol. An automatic determination is made, in the given computing environment within which the compute node currently operates, whether or not to certify the compute node for the second communication protocol.

These and other features and advantages of the invention will become more readily apparent from the accompanying drawings and the following detailed description.

DETAILED DESCRIPTION

Figure 1:
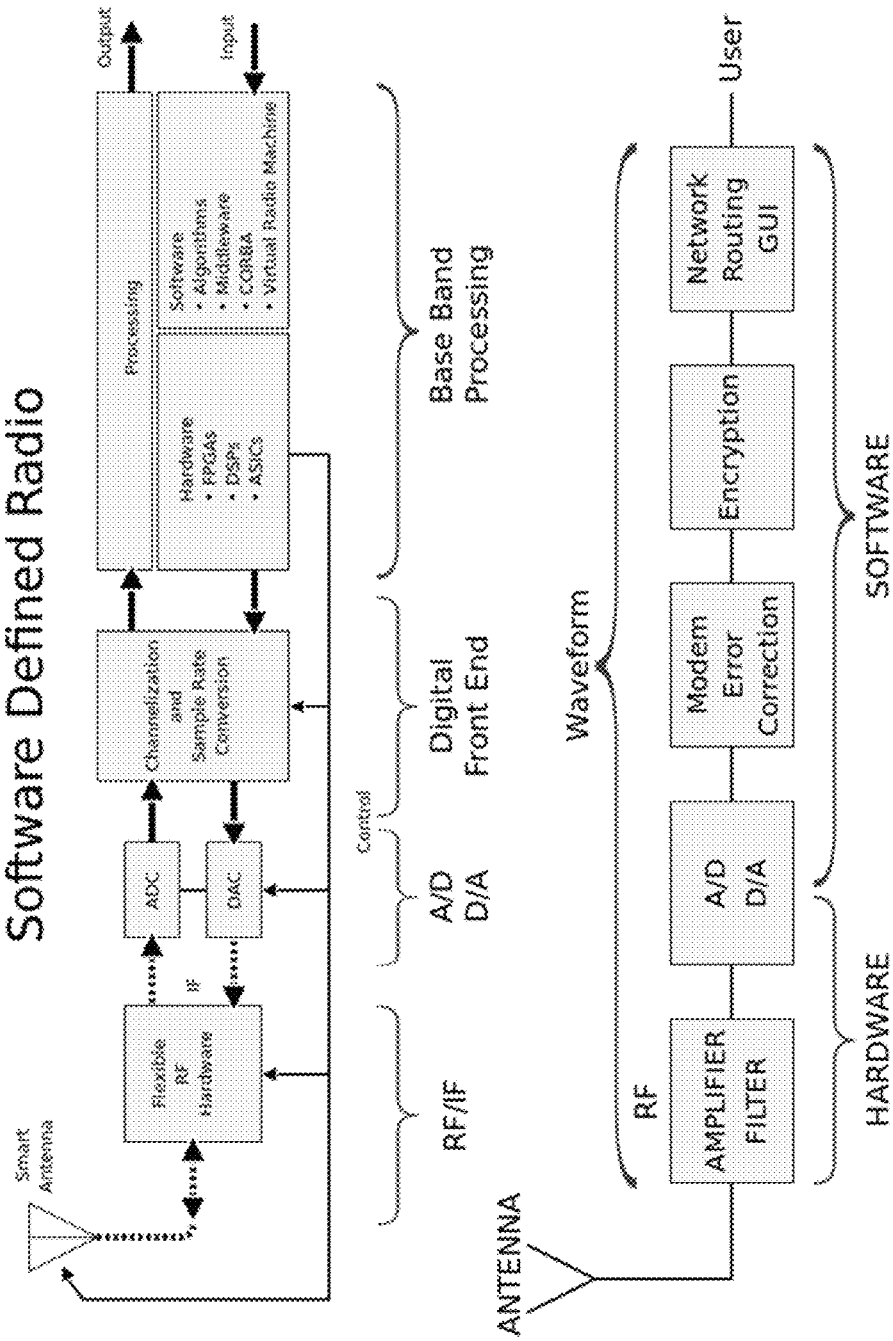
FIG. 1 illustrates an example of a software defined radio architecture with which one or more illustrative embodiments can be implemented.

Illustrative embodiments may be described herein with reference to one or more of exemplary communication systems, data repositories, data centers, data processing systems, computing systems, information processing systems, data storage systems and associated servers, computers, storage units and devices and other processing devices. It is to be appreciated, however, that embodiments of the invention are not restricted to use with the particular illustrative system and device configurations shown. Moreover, the phrases "communication system," "data repository," "data center," "data processing system," "computing system," "data storage system," "information processing system" and the like, as used herein, are intended to be broadly construed. By way of example only, while systems described herein may include cloud infrastructure as well as other types of systems comprising distributed virtual infrastructure, alternative embodiments may comprise non-cloud computing infrastructure, or combinations of cloud infrastructure and non-cloud infrastructure.

Some embodiments may comprise a cloud infrastructure hosting multiple tenants that share cloud computing resources. Such systems are considered examples of what are more generally referred to herein as cloud computing environments or platforms. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person(s) or system.

On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of IT infrastructure. However, a given embodiment may more generally comprise any arrangement of one or more processing devices.

As used herein, the term "gateway" is intended to be broadly construed. By way of example only, a gateway is a compute node or device that enables data communications between at least two discrete networks. For example, in an IoT environment, data collected from sensors is often aggregated on a gateway before being forwarded on to analytic engines on a cloud platform or other computing platform.

Still further, while illustrative embodiments are described herein in the context of an IoT environment, device management according to alternative embodiments may be implemented in computing environments other than IoT gateway environments, e.g., computer environments, mobile phone environments, etc.

As mentioned above in the background section, the more wireless communication protocols supported by an IoT gateway, the longer the FCC certification process. For at least this reason, it is difficult to find a certified, flexible gateway that can support a large permutation of connectivity options, i.e., communication protocols.

This challenge of pursuing and maintaining certifications for regions across the globe is commonly cited as one of the biggest hurdles in the IoT gateway development process, and an inhibitor to scaling globally while minimizing complexity and cost. Such certifications and the processes for obtaining them are fragmented and difficult to manage across geographic regions.

It is realized herein that some gateway devices, e.g., Gen 2 edge gateways from Dell Technologies Inc. (Round Rock, Tex.), are taking a modular approach to address the certification issue, with wireless modules being certified separately from the host gateway nodes. However, this modularity adds a cost, and it is not feasible for devices at lower gateway price points (and into the sensing layer) where most of the volume resides. Re-certification becomes particularly problematic after a customer deploys a gateway and wants to leverage a new type of connectivity (e.g., stop using LoRaWAN™ and adopt WiFi). This certification delay is a problem for customers (e.g., their gateways are not dynamic enough to handle changing connectivity requirements) and vendors (e.g., it can take months for companies to add and certify a new connectivity option).

It is further realized herein that a technology that can help solve this problem is software-defined radio (SDR) technology. SDR is a radio communication system where components that have been traditionally implemented in hardware are alternatively implemented via software executing on a computing platform (e.g., personal computer or embedded system).

FIG. 1 illustrates an example of an SDR architecture 100 with which one or more illustrative embodiments can be implemented. It is to be understood that the SDR architecture 100 is only an example of an SDR system with which embodiments may be implemented. Specific details of the software and hardware components of SDR architecture 100 (e.g., mixers, filters, amplifiers, modulators/demodulators, analog-to-digital and digital-to-analog converters, antennas, digital signal processors, middleware, algorithms, etc.) are not explicitly described herein as they are well known to those ordinarily skilled in the art.

It is realized herein that SDR technology, such as SDR architecture 100, makes it possible for a standard gateway platform to programmatically alter its connectivity capabilities (i.e., available communication protocols) on-the-fly. For example, if a gateway has been purchased with a given stock keeping unit (SKU) to communicate with sensors using cellular connectivity, a new SKU can be applied to the device that programs it to support WiFi connectivity by tuning the SDR parameters to function for that particular communication band. However, the promise of implementing SDR techniques for gateways is constrained by challenges associated with the certification process.

Figure 2:
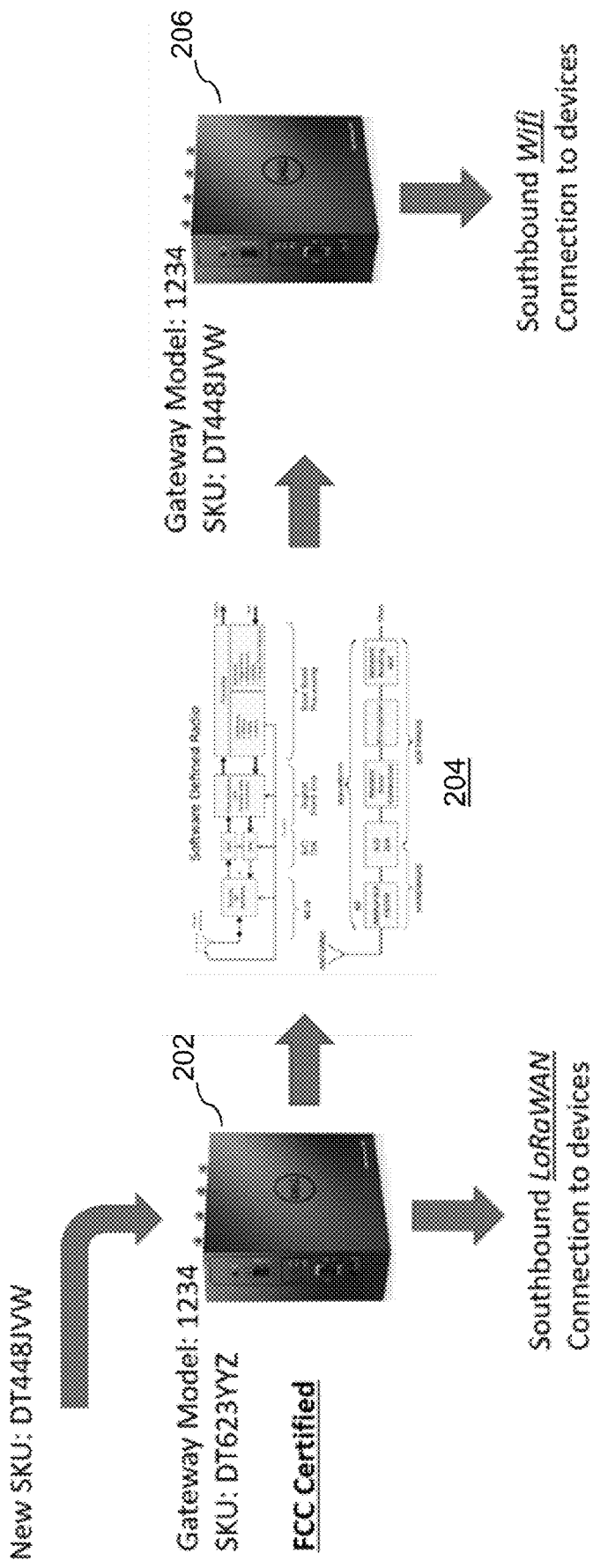
FIG. 2 illustrates an example of a process for enabling a new communication protocol via a software defined radio with which one or more illustrative embodiments can be implemented.

FIG. 2 illustrates an example of a new SKU (enabling software-defined WiFi connectivity) arriving at a gateway 202 that has been previously certified using a different SKU. More particularly, in this example, assume that gateway 202 is a Dell Gateway (model 1234) that is currently deployed and communicating southbound via LoRaWAN™ connectivity. It is to be understand that the term "southbound" and the corresponding term "northbound" refer to a particular direction of connectivity with respect to the gateway. Typically, "northbound" refers to connectivity between the gateway and another computing platform that uses the IoT data collected by the gateway, e.g., a cloud computing platform, analytic platform, or some other platform associated with an enterprise or entity. "Southbound" refers to connectivity between the gateway and the sensors and/or actuators that comprise the IoT environment. It is assumed that the FCC has certified (through the certification process mentioned above) that the SKU (DT623YYZ) for that functionality (LoRaWAN™) is within safe EMI limits. Assume that a new SKU (DT448JVW) then arrives at the gateway 202, and the gateway 202 uses programmability techniques of an SDR architecture 204 resident in the gateway (e.g., similar to the SDR architecture 100 in FIG. 1) to enable southbound WiFi on the gateway. The reprogrammed gateway is referred to as gateway 206.

It is to be appreciated that while FIG. 2 highlights gateways and other devices (e.g., sensors), challenges described herein apply to other types of configurations (e.g., mobile devices, cell phones, etc.). There are a number of challenges that emerge with this reprogramming approach.

Out of compliance. With the current certification process, the gateway 206 with the new SKU would need to undergo re-certification (usually not possible for a customer to undergo). Therefore, the customer would be out of compliance and subject to fines (especially if the new SKU resulted in EMI above acceptable limits).

Lack of certification for dynamic protocol modification. Certification authorities currently lack the ability to apply new SKUs/permutations against a gateway running an SDR framework. Note that the certification authority can be the FCC or a certification company or agency (entity) that is authorized to implement or otherwise oversee the EMI testing and certification process.

Lack of payment for certification of dynamic protocols. Certification authorities get paid for certifying devices. Dynamically certifying devices after customer installation would result in a decrease in revenue for these certification authorities. Therefore, these authorities have no incentive to move towards a dynamic scheme.

Vendor SKU generation for SDR. Gateway vendors (e.g., Dell) do not currently have a framework for generating SKUs that alter the protocol support shipped from the factory.

Re-certification via on-site EMI testing. Measuring EMI after a dynamic upgrade on-site would currently require the manual installation of EMI measurement devices, people to install them, processes to verify the results, etc. This would be costly, error-prone, and time-consuming. There is no incentive to perform this type of testing.

Cost and delay of initial certification. In addition to the inability to dynamically certify, the process of certification is slow and costly. It is realized herein that the delays and costs could be decreased through the adoption of SDR application programming interfaces (APIs).

Illustrative embodiments overcome the above and other drawbacks by utilizing decentralized technologies (e.g., distributed ledgers or blockchains), cryptocurrency, and cryptography to dynamically certify on-site changes to radio protocols. Illustrative embodiments apply to many different types of configurations including, but not limited to, edge gateways, servers, sensors, actuators, mobile devices, etc.

Figure 3:
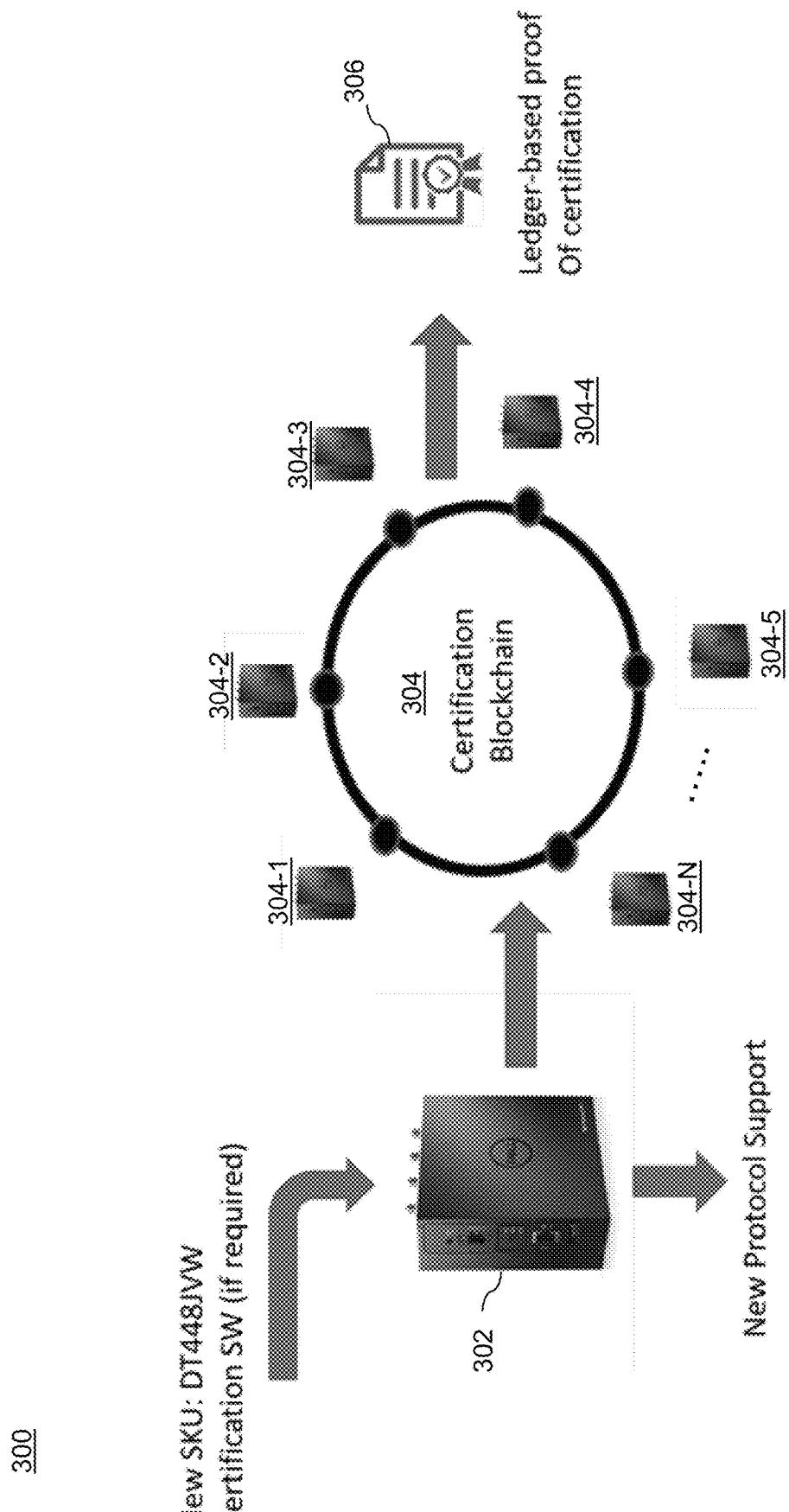
FIG. 3 illustrates a system for dynamically certifying communication protocol changes to software defined radio implemented devices in accordance with an illustrative embodiment.

FIG. 3 illustrates a system 300 for dynamically certifying protocol changes to SDR implemented devices in accordance with an illustrative embodiment. As shown, gateway 302 is configured to receive and apply one or more reconfiguration instructions associated with a new SKU, and use one or more SDR APIs (as mentioned above) to alter existing communication protocol support (e.g., LoRaWAN™) to a new communication protocol support (e.g., WiFi). In one or more embodiments, gateway 302 is also configured to receive and apply new certification software that participates in the dynamic certification of the new SKU. In one or more embodiments, the SKU and certification software are part of a certification software package, as will be further described below.

Furthermore, as shown in FIG. 3, a certification blockchain 304 (also referred to as a digital ledger) is provided that validates certification and keeps an immutable record of certification events across multiple compute nodes including gateway 302. As shown, blockchain 304 comprises a plurality of compute nodes 304-1 through 304-N. Gateway 302 is assumed to be one of the plurality of compute nodes 304-1 through 304-N. That is, the blockchain 304 includes a network of devices (e.g., gateways and, in some embodiments, other nodes) that dynamically participate in EMI testing. In some embodiments, the certification authority (e.g., the FCC and/or an accredited certification firm as described below in the context of FIG. 5) can also maintain one or more compute nodes on the blockchain 304 that participate in the certification process. The system 300 in FIG. 3 results in a validated, immutable, time-stamped record of certification, i.e., ledger-based proof of certification 306, that removes much of the cost and delay experienced by customers, vendors, and certification authorities.

Before further describing various aspects and advantages of system 300, a brief description of blockchain technology will first be provided.

As used herein, the terms "blockchain," "distributed ledger" and "digital ledger" may be used interchangeably. A blockchain or digital ledger protocol is implemented via a distributed, decentralized computer network of computing resources or nodes (e.g., compute nodes 304-1 through 304-N). The compute nodes are operatively coupled in a peer-to-peer communications protocol. In the computer network, each compute node is configured to maintain a blockchain which is a cryptographically secured record or ledger of data blocks that represent respective transactions within a given computational environment (e.g., transactions are events associated with reprogramming gateways for one or more new communication protocols and certifying them for FCC compliance). The blockchain is secured through use of a cryptographic hash function. A cryptographic hash function is a cryptographic function which takes an input (or message) and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In existing digital ledger technologies such as blockchain, an underlying consensus algorithm is typically used to validate new transactions before they are added to the digital ledger. Typically, for example, the new transaction entry is broadcast to all or a subset of nodes within the network and inspected. The entry is formally committed to the blockchain when consensus is reached by the recipient nodes that the entry is valid.

The blockchain distributed ledger may be a "bitcoin" type implementation. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the network (or any other node or party). For this reason, a cryptographic hash function is used. Each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work."

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Figure 4:
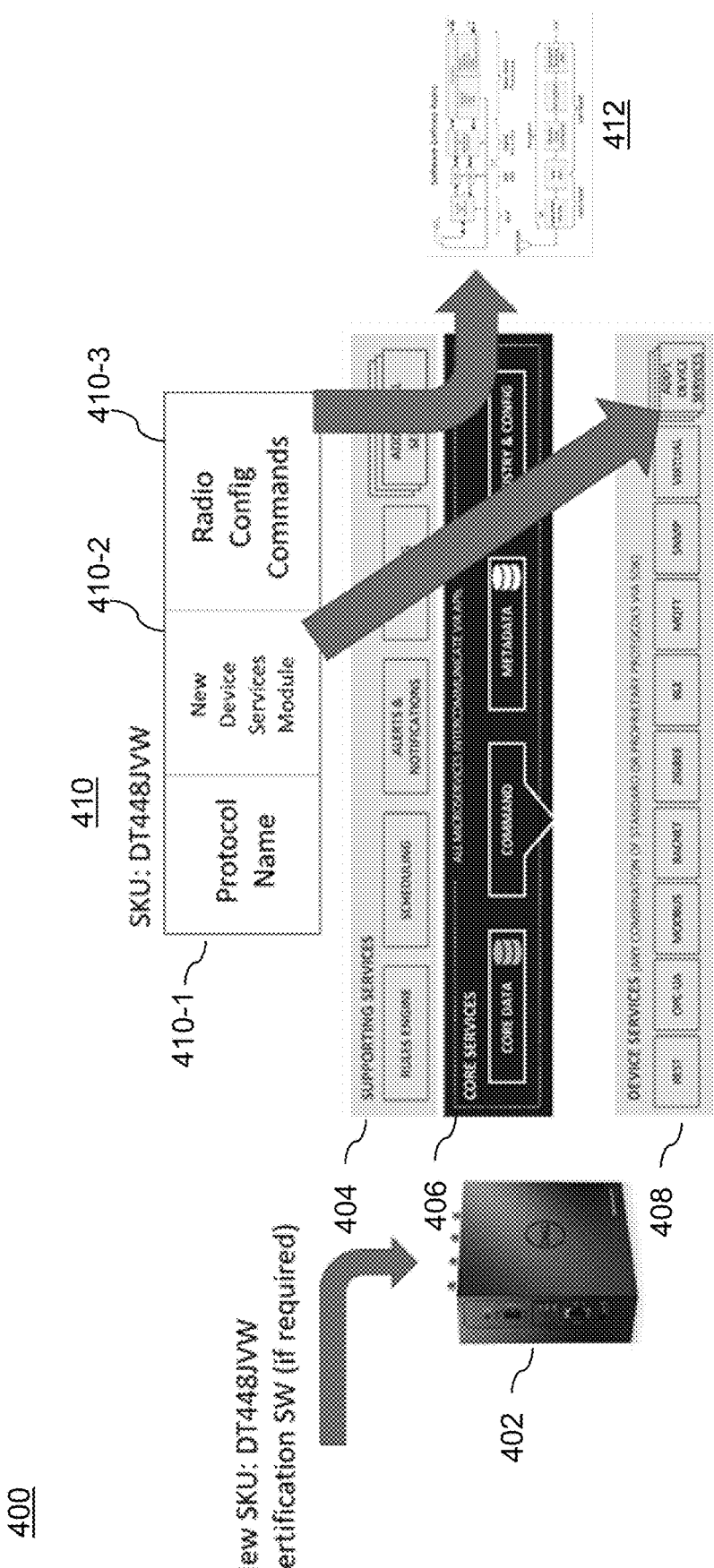
FIG. 4 illustrates a process for dynamically certifying communication protocol changes to software defined radio implemented devices in accordance with an illustrative embodiment.

Consider an example where a new communication protocol is developed that enables gateway connection to a specific type of device. FIG. 4 illustrates a new SKU (DT448JVW) that arrives at the gateway 402. The SKU, in this example, is a package of software modules 410 (one or more programmatic instructions) for installing the new protocol and connecting to the device.

In FIG. 4, it is assumed that the gateway 402 executes EdgeX Foundry™ (The Linux Foundation®) software. EdgeX Foundry™ software provides an open source microservices framework that allows a connection and execution environment for edge devices, e.g., sensors and/or actuators operatively coupled to a gateway. The software, as shown, comprises supporting services 404, core services 406, and device services 408. These supporting, core, and device services 404, 406, and 408 have functions that are known to those of ordinary skill in the art and otherwise described in EdgeX Foundry™ documentation, and are therefore not further expressly described herein.

Assume a new device services module is part of the SKU package 410. This new device service 410-2 is added to the southbound layer of EdgeX Foundry™, and now support for a new communication protocol (protocol name 410-1) has been added. A set of SDR configuration commands 410-3 instruct the gateway 402 how to tune the SDR architecture 412 (resident in the gateway 402) for the new connectivity option (i.e., the new communication protocol). The term "tune" is broadly construed to mean modifying, through one or more APIs, parameters of the SDR architecture 412 that enable the SDR architecture to function in accordance with the new communication protocol (i.e., reconfigure the gateway 402 to support the new protocol). With software and hardware support in place for the new communication protocol, a user can now connect IoT devices (sensors and/or actuators) via the new communication protocol.

Figure 5:
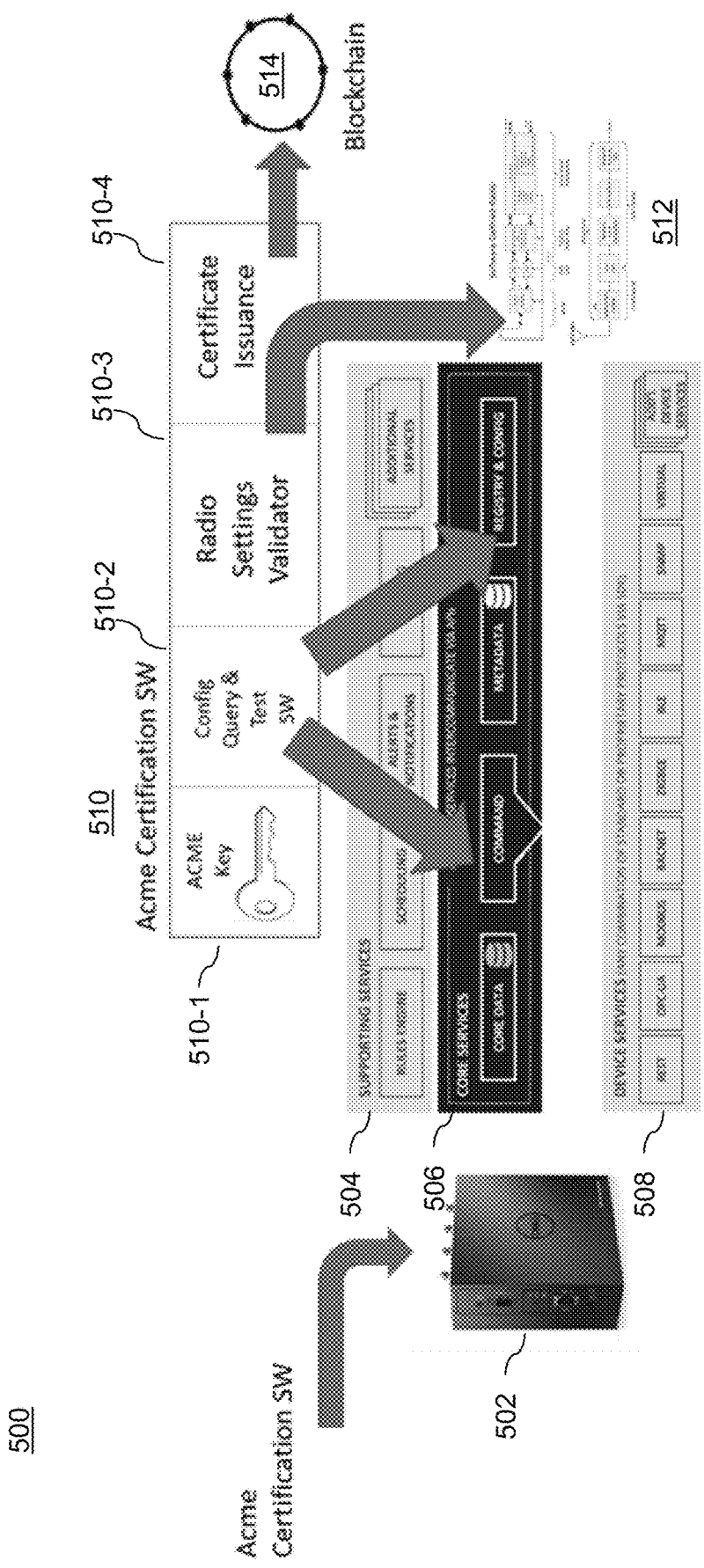
FIG. 5 illustrates dynamic certification software and a corresponding system in accordance with an illustrative embodiment.

FIG. 5 illustrates dynamic certification software and system 500 in accordance with an illustrative embodiment. An accredited certification firm is a company that has gone through an approval process (e.g., FCC approval) to perform EMI testing and issue approval certificates. As these companies (entities) begin to familiarize themselves with SDR programmability, it is assumed that they will ultimately create automated frameworks for programming (and subsequently testing) a variety of SDR permutations. For example, these firms will be able to accept a new SKU coming from a vendor, install it on a device (e.g., a gateway), and perform instant (or contemporaneous) certification testing and SKU approval. In accordance with illustrative embodiments, recording of the resulting EMI emissions, along with the SKU and the model of the gateway, are digitally (and permanently) recorded as part of the certification process on a certification blockchain as depicted in FIG. 5. This enables firms to create dynamic certification software components in the field.

More particularly, FIG. 5 highlights an example of a certification company (e.g., Acme) using this approach. As shown, a gateway 502 is running EdgeX Foundry™ software comprising supporting services 504, core services 506, and device services 508 (respectively similar microservices as 404, 406, and 408 described above). The certification company provides certification software package 510 to the gateway 502 (e.g., transmits package 510 via a communication network coupling one or more servers of the certification company and the gateway 502). That is, in this example, dynamic certification software 510 is downloaded to gateway 502 running EdgeX Foundry™ software. In some embodiments, the dynamic certification software 510 is previously loaded on the gateway 502 by the certification company during the original certification process for gateway 502.

The certification software package 510 comprises a cryptographic key 510-1. In some embodiments, the key 510-1 enables the gateway 502 to verify that the certification software package 510 is from the certification company. For example, in some embodiments, key 510-1 is used as part of a digital signature generated by the certification company. The certification software package 510 further comprises configuration query and test software module 510-2, a radio settings validator module 510-3, and a certificate issuance module 510-4, as will be further described below.

In illustrative embodiments, the certification software package 510 certifies the configuration of gateway 502 in one or more ways:

(1) Configuration query and test software module 510-2 queries one or more or the services (504, 506 and/or 508) of gateway 502 to obtain configuration parameters of the gateway 502. Radio settings validator module 510-3 examines the configuration parameters (e.g., radio settings of the SDR architecture 512) and compares the configuration parameters against known SKUs that have already been certified, e.g., in another facility. These known SKUs accompany the certification software or they are retrieved from a separate computing platform (e.g., cloud computing platform).

(2) Configuration query and test software module 510-2 drives activity within the configuration and measures the results. In some embodiments, driving activity involves repeatedly using the communication protocol associated with connectivity with the sensors/actuators in the IoT environment and/or driving central processing unit (CPU) utilization. The term "driving" is intended to be broadly construed to mean causing execution or performance of some function or some activity. The output of this activity is then compared against thresholds.

(3) Configuration query and test software module 510-2 compares the configuration to "maxed-out" testing that had occurred previously. That is, certification agencies often activate every communication protocol in order to cause a maximum EMI condition, and test the acceptability of the EMI in this fully-driven state. If the configuration is known to use only one protocol then the certification software 510 may certify the configuration because it will be below the maximum limits.

Illustrative embodiments described above are run in the context of one gateway (Single-GW-Certification). In alternative embodiments, additional certification activity is invoked by leveraging peer devices and/or gateways (Multi-GW-Peer-Certification) that are part of the certification blockchain. Peer certification will be further described below.

Once accredited certification software 510 has determined that the new SKU is compliant, it issues certification results (e.g., certificate or certification) via certificate issuance module 510-4. In one embodiment, a timestamped entry of the certification results is created and digitally signed with a private key known only to the accredited company (e.g., key 510-1). This entry is then recorded in one or more ways. In one or more illustrative embodiments, the digitally-signed certification is stored as a transaction within a blockchain 514. The peers in this blockchain 514 are any number of corporate entities, such as other gateways, edge servers, or corporate (cloud) servers. The use of a blockchain 514 also provides an incentive for an accredited company to move to a dynamic certification model as will be described below. An alternative embodiment stores the digitally-signed certification in an immutable context, emailing it, or transferring it to a known location.

Furthermore, in one or more embodiments, if certification software (e.g., 510) from a given certification company (e.g., Acme) has determined that a new SKU is compliant, the certification company receives compensation for the certification by invoking a smart contract that transfers monetary tokens (e.g., bitcoins) to the certification company. Such payment therefore provides incentive for the company to dynamically certify new communication protocols.

Figure 6:
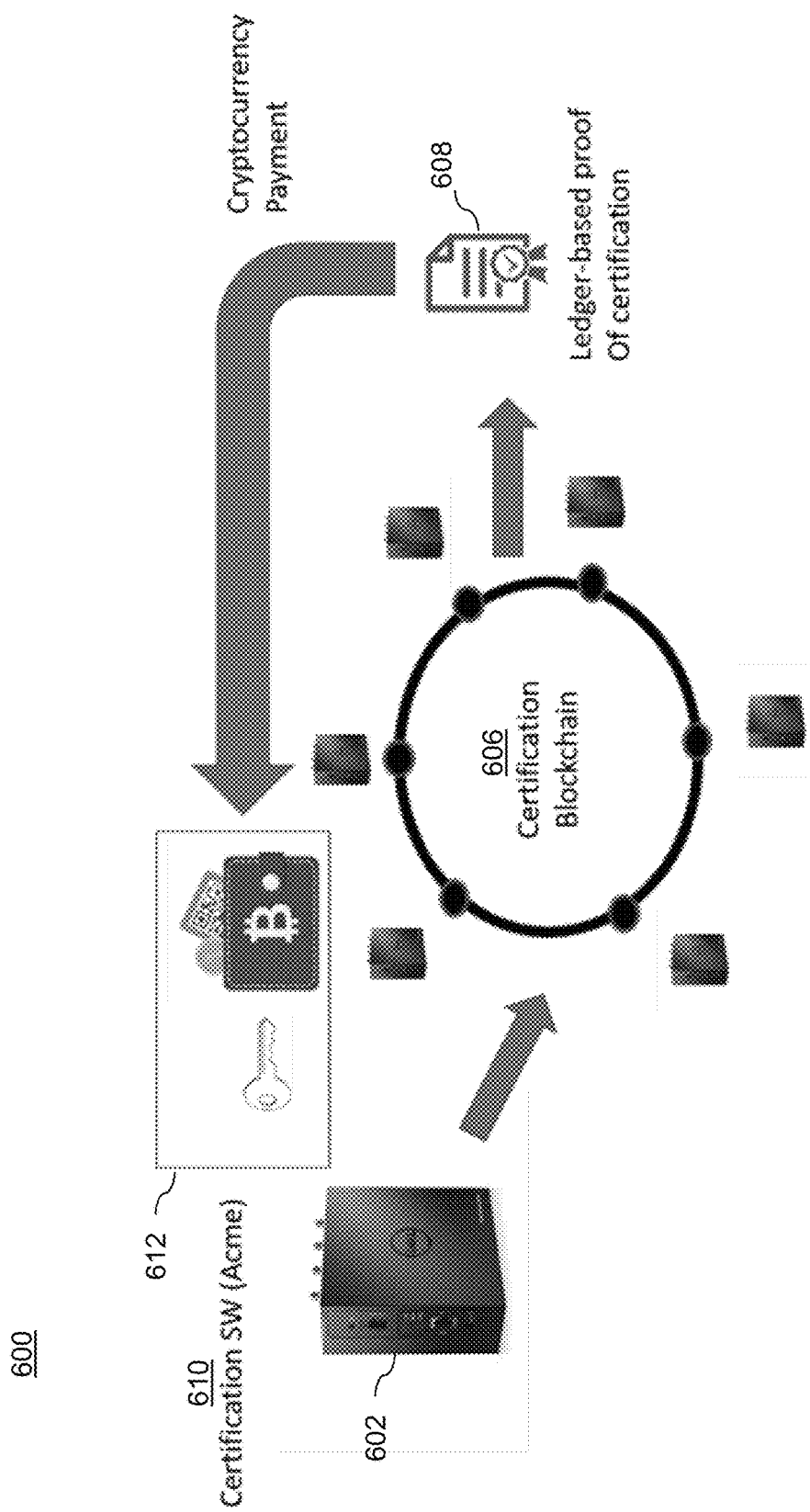
FIG. 6 illustrates a process for cryptocurrency payment to a certification entity in accordance with an illustrative embodiment.

FIG. 6 illustrates a process 600 for cryptocurrency payment to a certification company in accordance with an illustrative embodiment. Assume that certification software 610 (e.g., similar to 510 in FIG. 5) publishes the certification results to a certification blockchain 606. Validation by peer nodes (proof of certification 608) within blockchain 606 triggers the transfer of cryptocurrency payment (e.g., bitcoins) to a digital wallet 612 of the certification company that provided the certification software 610.

As mentioned above, in some embodiments, the dynamic certification of a new gateway communication protocol by an accredited company is augmented by involving peer devices or gateways that are connected via a network. Alternatively, in some embodiments, peer devices or gateways are responsible for the certification without the involvement of a certification company.

Figure 7:
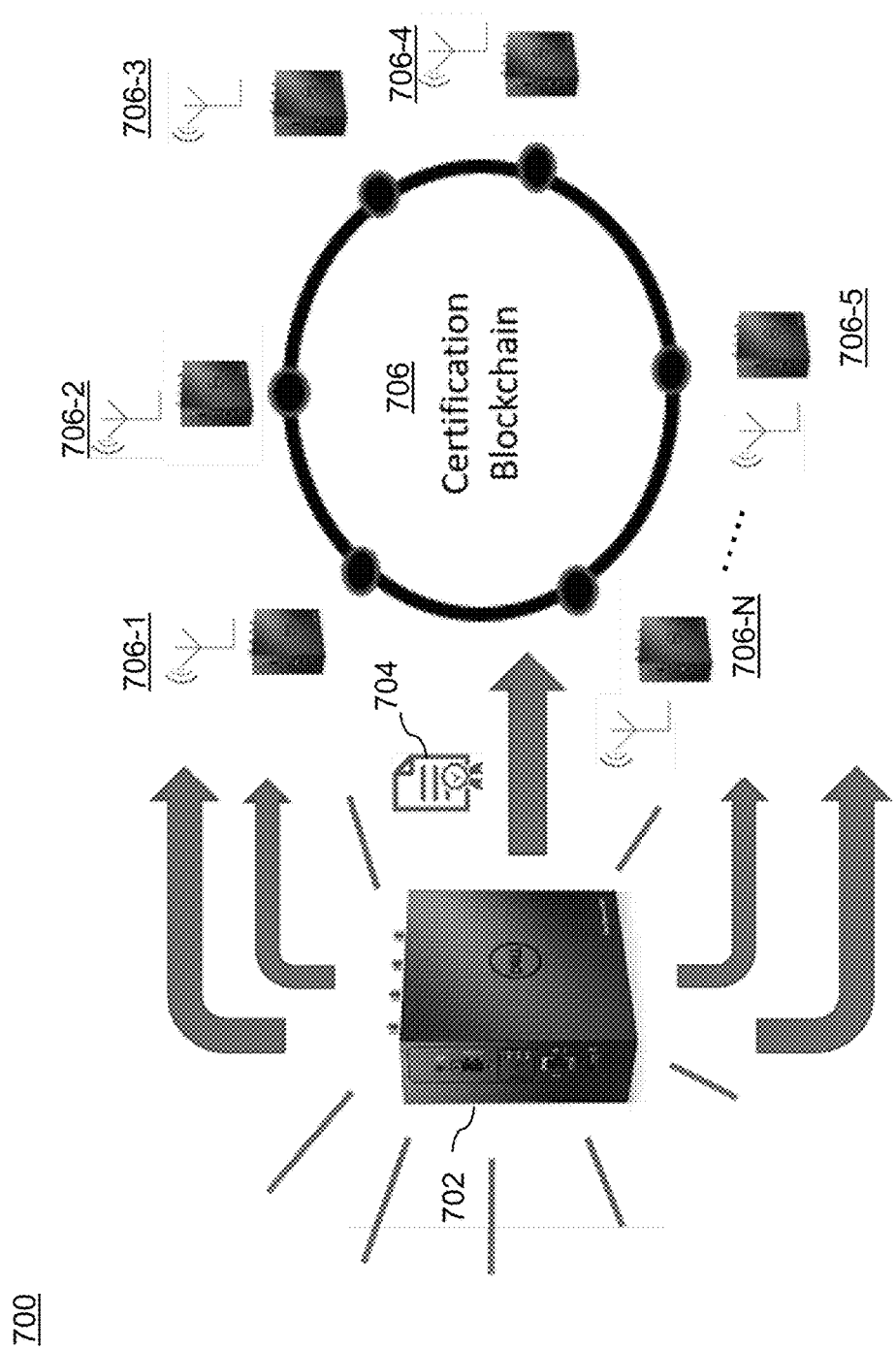
FIG. 7 illustrates a process for peer certification in accordance with an illustrative embodiment.

An example of a peer certification process 700 is shown in FIG. 7. Assume that, for a gateway 702, a certification 704 is issued, as described above, and stored on a certification blockchain 706 (of which gateway 702 is one of the blockchain nodes). In response, peer gateways 706-1 through 706-N (also blockchain nodes of certification blockchain 706) enter into a monitoring (or sniff) mode while the certification software on gateway 702 drives the new protocol (and/or drives CPU utilization at the same time) as described above.

The certification 704 entered into the blockchain 706 highlights which protocols are being certified (e.g., the gateway is using LoRaWAN™ for the first time). The peer gateways 706-1 through 706-N are now aware of this certification 704, either because they are being requested to validate the transaction, or because they see the certification suddenly appear in the ledger. The peer gateways 706-1 through 706-N subsequently set themselves into a monitoring mode. For example, a given peer gateway (through monitoring mode software residing thereon) programmatically modifies its corresponding SDR architecture to monitor for specific signals (EMI) from gateway 702 as gateway 702 drives the new protocol and/or CPU utilization thereon, and determines if the strength of said signals exceeds a specific signal limit. In various embodiments, the monitoring mode software that is running on the peer gateways is from the same vendor as the certification software, a different certification company, or a gateway vendor.

Once a certain time period has elapsed, in one or more embodiments, each of the peer gateways 706-1 through 706-N records their measurements in blockchain 706 and also digitally sign the results (as well as publishes the readings that they detected). These readings may be required to fully validate the original certification blockchain request, or they may be follow-on certifications that add additional weight to the original certification.

There are many incentives for participating in a peer network certification, by way of example only:

(i) The gateways in the network recognize that dynamic certification is beneficial for the entire ecosystem.

(ii) The gateways in the network wish to profit by temporarily rendering their monitoring capabilities for monetary advantage as described below.

In some embodiments, techniques such as proof-of-stake or Byzantine Fault Tolerance (voting) may be used in the blockchain methodology. Further, in certain embodiments, gateways are configured to validate a certification request by performing compliance testing and then validating the request after measuring EMI compliance is within range.

In further embodiments, gateways that participate in monitoring peer EMI outputs create a report of their results and store those results on a blockchain (these results can actually fail certification as well as pass).

Further, similar to functionality described above and in accordance with one or more illustrative embodiments, a gateway in a monitoring mode calls a smart contract which transfers cryptocurrency to the monitoring gateway. The cryptocurrency paid to the monitoring gateway is a reward (defined via the smart contract) for the monitoring gateway dedicating some of its resources to help perform the EMI testing. This incentivizes peers to dedicate themselves to fast, dynamic certification of peer gateways that have undergone new/additional protocol conversions.

Figure 8:
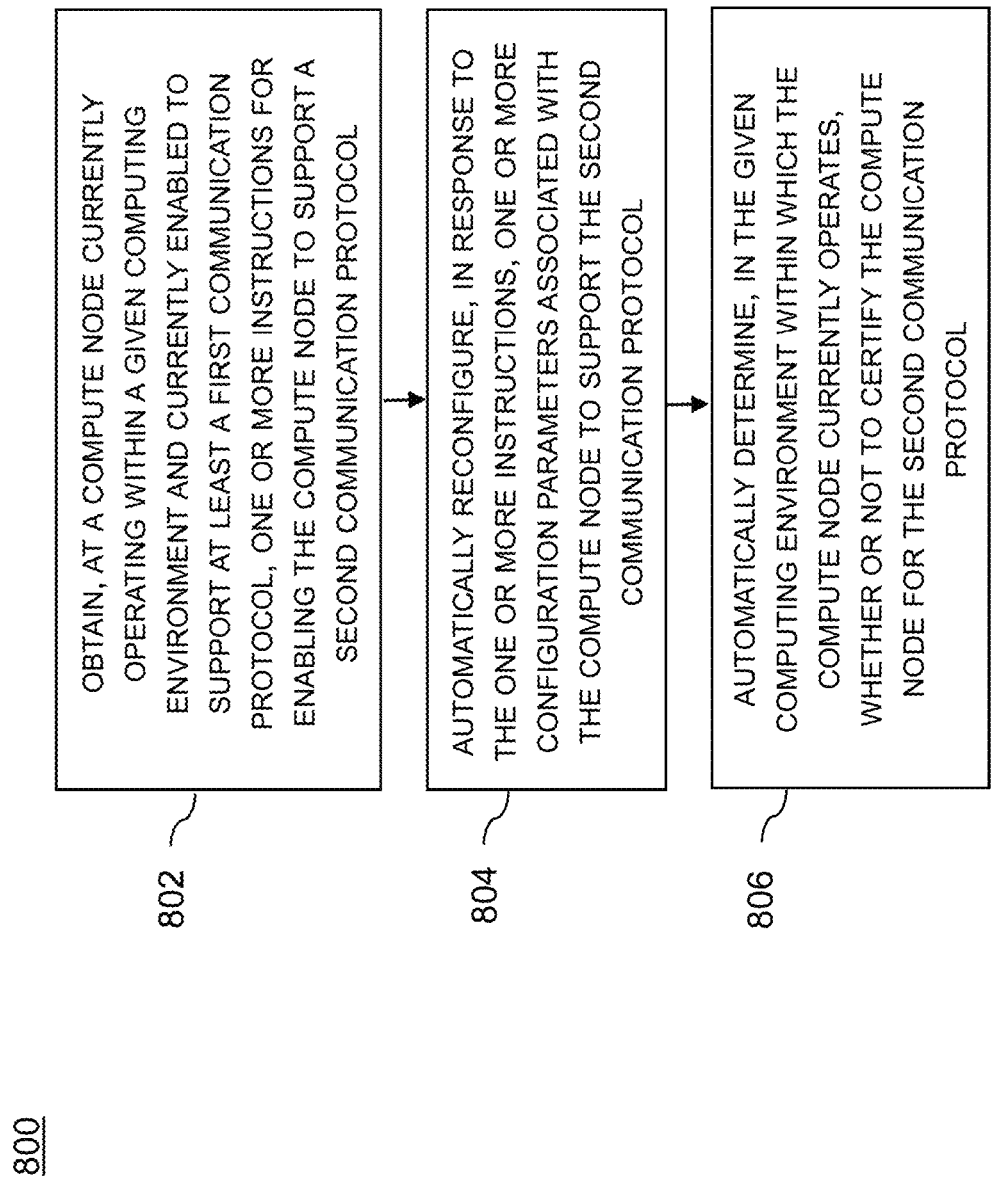
FIG. 8 illustrates a methodology for dynamically certifying communication protocol changes to software defined radio implemented devices in accordance with an illustrative embodiment.

FIG. 8 illustrates a methodology 800 for dynamically certifying communication protocol changes to software defined radio implemented devices in accordance with an illustrative embodiment.

As shown, step 802 obtains, at a compute node currently operating within a given computing environment and currently enabled to support at least a first communication protocol, one or more instructions for enabling the compute node to support a second communication protocol.

Step 804 automatically reconfigures, in response to the one or more instructions, one or more configuration parameters associated with the compute node to support the second communication protocol.

Step 806 automatically determines, in the given computing environment within which the compute node currently operates, whether or not to certify the compute node for the second communication protocol.

Advantageously, it is to be appreciated that the steps of automatically reconfiguring the compute node, and automatically determining whether or not to certify the compute node for the second communication protocol are performed in the given computing system within which the compute node currently operates. For example, this means that a compute node is automatically reconfigured, and automatically tested for certification instantaneously or substantially contemporaneous with the reconfiguration, in place or within the field thus enabling dynamic certification of on-site changes to radio protocols. That is, as illustratively described herein, the phrase "in the given computing system within which the compute node currently operates" means that such dynamic certification can be performed within the compute node, outside the compute node by one or more other compute nodes, or in combination with the compute node and one or more other compute nodes. In some embodiments, the compute node is part of a distributed ledger system with one or more peer compute nodes.

In another illustrative embodiment, the method drives activity in the compute node to obtain one or more signal measurements (e.g., EMI levels) associated with the second communication protocol, and utilizes the one or more signal measurements to automatically determine whether or not to certify the compute node for the second communication protocol.

In a further illustrative embodiment, the method obtains one or more configuration parameters associated with one or more other compute nodes that are certified to support the second communication protocol, compares the one or more reconfigured configuration parameters associated with the compute node to the one or more configuration parameters associated the one or more other compute nodes that are certified to support the second communication protocol, and utilizes the comparison to automatically determine whether or not to certify the compute node for the second communication protocol.

In yet another illustrative embodiment, the method drives activity in the compute node to transmit one or more signals associated with the second communication protocol, obtains one or more signal measurements corresponding to the one or more transmitted signals from one or more peer compute nodes configured to monitor the one or more transmitted signals, and utilizes the one or more signal measurements to automatically determine whether or not to certify the compute node for the second communication protocol. In some illustrative embodiments, the peer compute nodes and the compute node are part of a distributed ledger system.

In one or more additional illustrative embodiments, the compute node is a device comprising a software defined radio architecture that is programmatically configurable through the one or more configuration parameters to support different communication protocols.

Figure 9:
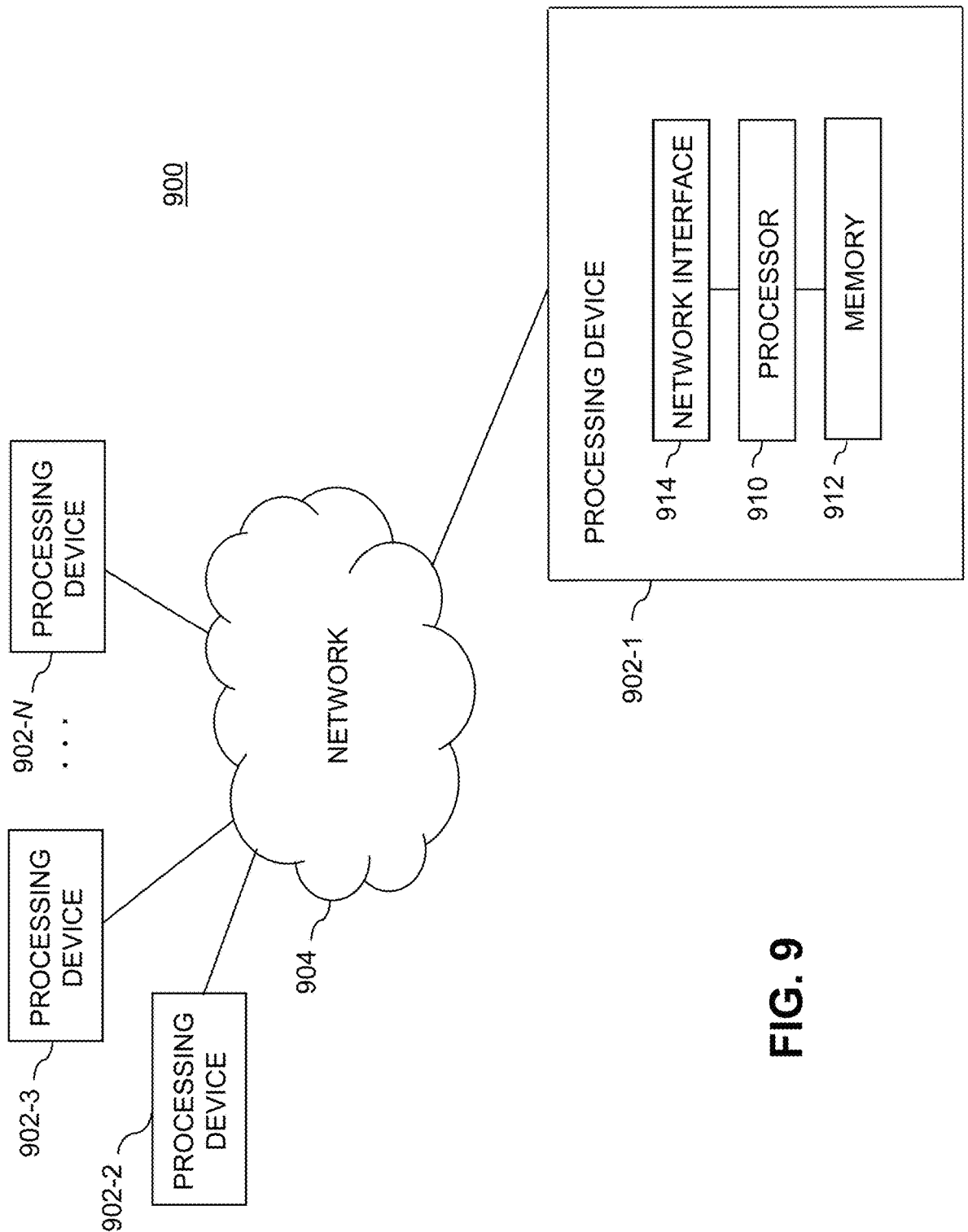
FIG. 9 illustrates a processing platform used to implement a system for dynamically certifying communication protocol changes to software defined radio implemented devices according to an illustrative embodiment of the invention.

As an example of a processing platform on which a dynamic ledger-based certification system (as shown in FIGS. 1-8) according to illustrative embodiments can be implemented is processing platform 900 shown in FIG. 9. The processing platform 900 in this embodiment comprises a plurality of processing devices, denoted 902-1, 902-2, 902-3, ... 902-N, which communicate with one another over a network 904. It is to be appreciated that methodologies described herein may be executed in one such processing device 902, or executed in a distributed manner across two or more such processing devices 902. Thus, the dynamic ledger-based certification system may be executed in a distributed manner across two or more such processing devices 902. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 9, such a device comprises at least one processor and an associated memory, and implements one or more functional modules for instantiating and/or controlling features of systems and methodologies described herein. Multiple elements or modules may be implemented by a single processing device in a given embodiment.

The processing device 902-1 in the processing platform 900 comprises a processor 910 coupled to a memory 912. The processor 910 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 910. Memory 912 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 912 may comprise electronic memory such as random access memory (RAM), read-only memory (ROM) or other types of memory, in any combination. The one or more software programs when executed by a processing device, such as the processing device 902-1, causes the device to perform functions associated with one or more of the components/steps of system/methodologies in FIGS. 1-8. One skilled in the art would be readily able to implement such software given the teachings provided herein. Other examples of processor-readable storage media embodying embodiments of the invention may include, for example, optical or magnetic disks.

Processing device 902-1 also includes network interface circuitry 914, which is used to interface the device with the network 904 and other system components. Such circuitry may comprise conventional transceivers of a type well known in the art.

The other processing devices 902 (902-2, 902-3, ... 902-N) of the processing platform 900 are assumed to be configured in a manner similar to that shown for processing device 902-1 in the figure.

The processing platform 900 shown in FIG. 9 may comprise additional known components such as batch processing systems, parallel processing systems, physical machines, virtual machines, virtual switches, storage volumes, etc. Again, the particular processing platform shown in this figure is presented by way of example only, and the dynamic ledger-based certification system described herein may include additional or alternative processing platforms, as well as numerous distinct processing platforms in any combination.

Also, numerous other arrangements of servers, clients, computers, storage devices or other components are possible in processing platform 900. Such components can communicate with other elements of the processing platform 900 over any type of network, such as a wide area network (WAN), a local area network (LAN), a satellite network, a telephone or cable network, or various portions or combinations of these and other types of networks.

Furthermore, it is to be appreciated that the processing platform 900 of FIG. 9 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 900 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the dynamic ledger-based certification system may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
obtaining, at a compute node currently operating within a given computing environment and currently enabled to support at least a first communication protocol, one or more instructions for enabling the compute node to support a second communication protocol;
automatically reconfiguring, in response to the one or more instructions, one or more configuration parameters associated with the compute node to support the second communication protocol; and
obtaining, by the compute node, a certification of the second communication protocol from one or more other compute nodes in the given computing environment within which the compute node currently operates;
wherein the steps are performed by at least one processing device comprising a processor and a memory.

2. The method of claim 1, further comprising:
driving activity in the compute node to obtain one or more signal measurements associated with the second communication protocol; and
utilizing the one or more signal measurements to automatically determine whether or not to certify the compute node for the second communication protocol.

3. The method of claim 1, further comprising:
obtaining one or more configuration parameters associated with one or more other compute nodes that are certified to support the second communication protocol;
comparing the one or more reconfigured configuration parameters associated with the compute node to the one or more configuration parameters associated with the one or more other compute nodes that are certified to support the second communication protocol; and
utilizing the comparison to automatically determine whether or not to certify the compute node for the second communication protocol.

4. The method of claim 1, further comprising:
obtaining testing results associated with one or more compute nodes that are certified to support multiple communication protocols including the second communication protocol, wherein the testing results comprise results from concurrently driving each of the multiple communication protocols; and
certifying the compute node for the second communication protocol when the second protocol is the only communication protocol which the compute node supports.

5. The method of claim 1, wherein the obtaining a certification step comprises generating certification results that comprise a certification that the compute node complies with one or more signal thresholds.

6. The method of claim 5, wherein the one or more signal thresholds comprise one or more electromagnetic interference thresholds.

7. The method of claim 1, wherein the compute node comprises a software defined radio architecture that is programmatically configurable through the one or more configuration parameters to support different communication protocols.

8. The method of claim 1, further comprising receiving a configuration query and testing package to determine whether or not to certify the compute node for the second communication protocol, wherein the configuration query and testing package is received from a certification entity.

9. The method of claim 1, further comprising submitting certification results, generated during the obtaining a certification step, for storage on a digital ledger system, wherein the compute node and one or more peer compute nodes are part of the digital ledger system.

10. The method of claim 9, further comprising one or more of:
digitally signing the certification results using a cryptographic key attributable to a certification entity prior to submitting the certification results for storage on the digital ledger system; and
triggering payment of cryptocurrency to the certification entity upon successful storage of the certification results on the digital ledger system.

11. The method of claim 1, further comprising:
driving activity in the compute node to transmit one or more signals associated with the second communication protocol;
obtaining one or more signal measurements corresponding to the one or more transmitted signals from one or more of the peer compute nodes configured to monitor the one or more transmitted signals; and
utilizing the one or more signal measurements to automatically determine whether or not to certify the compute node for the second communication protocol.

12. The method of claim 11, wherein monitoring the one or more transmitted signals triggers payment of cryptocurrency to one or more of the peer compute nodes.

13. An article of manufacture comprising a processor-readable storage medium having encoded therein executable code of one or more software programs, wherein the one or more software programs when executed by at least one processing device implement steps of:

obtaining, at a compute node currently operating within a given computing environment and currently enabled to support at least a first communication protocol, one or more instructions for enabling the compute node to support a second communication protocol;

automatically reconfiguring, in response to the one or more instructions, one or more configuration parameters associated with the compute node to support the second communication protocol; and obtaining, by the compute node, a certification of the second communication protocol from one or more other compute nodes in the given computing environment within which the compute node currently operates.

14. The article of claim 13, wherein the one or more software programs when executed by at least one processing device further implement steps of:

driving activity in the compute node to obtain one or more signal measurements associated with the second communication protocol; and utilizing the one or more signal measurements to automatically determine whether or not to certify the compute node for the second communication protocol.

15. The article of claim 13, wherein the one or more software programs when executed by at least one processing device further implement steps of:

obtaining one or more configuration parameters associated with one or more other compute nodes that are certified to support the second communication protocol;

comparing the one or more reconfigured configuration parameters associated with the compute node to the one or more configuration parameters associated with the one or more other compute nodes that are certified to support the second communication protocol; and utilizing the comparison to automatically determine whether or not to certify the compute node for the second communication protocol.

16. The article of claim 13, wherein the one or more software programs when executed by at least one processing device further implement steps of:

driving activity in the compute node to transmit one or more signals associated with the second communication protocol;

obtaining one or more signal measurements corresponding to the one or more transmitted signals from one or more peer compute nodes configured to monitor the one or more transmitted signals; and utilizing the one or more signal measurements to automatically determine whether or not to certify the compute node for the second communication protocol.

17. An apparatus comprising:

at least one processor operatively coupled to at least one memory configured to:

obtain, at a compute node currently operating within a given computing environment and currently enabled to support at least a first communication protocol, one or more instructions for enabling the compute node to support a second communication protocol;

automatically reconfigure, in response to the one or more instructions, one or more configuration parameters associated with the compute node to support the second communication protocol; and obtain, by the compute node, a certification of the second communication protocol from one or more other compute nodes in the given computing environment within which the compute node currently operates whether.

18. The apparatus of claim 17, wherein the at least one processor is further configured to:

drive activity in the compute node to obtain one or more signal measurements associated with the second communication protocol; and utilize the one or more signal measurements to automatically determine whether or not to certify the compute node for the second communication protocol.

19. The apparatus of claim 17, wherein the at least one processor is further configured to:

obtain one or more configuration parameters associated with one or more other compute nodes that are certified to support the second communication protocol;

compare the one or more reconfigured configuration parameters associated with the compute node to the one or more configuration parameters associated with the one or more other compute nodes that are certified to support the second communication protocol; and utilize the comparison to automatically determine whether or not to certify the compute node for the second communication protocol.

20. The apparatus of claim 17, wherein the at least one processor is further configured to:

drive activity in the compute node to transmit one or more signals associated with the second communication protocol;

obtain one or more signal measurements corresponding to the one or more transmitted signals from one or more peer compute nodes configured to monitor the one or more transmitted signals; and utilize the one or more signal measurements to automatically determine whether or not to certify the compute node for the second communication protocol.

\* \* \* \* \*